United States Patent
Samejima et al.

(10) Patent No.: US 7,404,282 B2
(45) Date of Patent: Jul. 29, 2008

(54) RIDING LAWN MOWER HAVING A FRONT MOWER UNIT

(75) Inventors: Kazuo Samejima, Kaizuka (JP);
Yoshikazu Togoshi, Osaka (JP);
Yoshiyuki Esaki, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/365,979

(22) Filed: Mar. 1, 2006

(65) Prior Publication Data

US 2006/0288682 A1   Dec. 28, 2006

(30) Foreign Application Priority Data

Jun. 27, 2005   (JP)   ............................. 2005-186629

(51) Int. Cl.
*A01D 34/00*   (2006.01)

(52) U.S. Cl. ........................... 56/14.9; 56/15.9; 56/17.1

(58) Field of Classification Search ................ 56/15.8, 56/15.9, 16.3, 17.1, 14.9
See application file for complete search history.

(56) References Cited

U.S. PATENT DOCUMENTS

| | | | |
|---|---|---|---|
| 5,079,907 A * | 1/1992 | Sameshima et al. .......... 56/15.9 |
| 5,410,865 A * | 5/1995 | Kurohara et al. ............. 56/15.9 |
| 5,459,984 A * | 10/1995 | Reichen et al. ................... 56/7 |
| 5,927,055 A * | 7/1999 | Ferree et al. .................. 56/15.9 |
| 6,341,480 B1 * | 1/2002 | Dahl et al. .................... 56/15.9 |
| 6,347,503 B1 * | 2/2002 | Esau et al. .................... 56/15.9 |
| 2002/0194826 A1 * | 12/2002 | Schick et al. ................. 56/15.9 |
| 2004/0221561 A1 * | 11/2004 | Koehn ......................... 56/15.9 |

FOREIGN PATENT DOCUMENTS

| | | |
|---|---|---|
| JP | 3-224402 | 10/1991 |
| JP | 4-82920 | 7/1992 |
| JP | 5-184217 | 7/1993 |
| JP | 6-319341 | 11/1994 |
| JP | 7-46924 | 2/1995 |

* cited by examiner

*Primary Examiner*—Thomas B Will
*Assistant Examiner*—Mai T Nguyen
(74) *Attorney, Agent, or Firm*—The Webb Law Firm

(57) ABSTRACT

A riding lawn mower having a front mower unit, comprises a plurality of wheels; a vehicle body supported by the wheels; an engine supported by the vehicle body for driving at least one of the wheels; a lift link supported by the vehicle body; a mower unit adapted to be disposed forwardly of the vehicle body, having at least one cutting blade, and supported to be pivotable about an axis of a first pivot pin relative to the lift link between a generally horizontal position wherein the at least one cutting blade faces the ground, and a generally vertical position wherein the at least one cutting blade is oriented forward; an assisting force exerting device for exerting an assisting force for moving the mower unit to the generally vertical position; a support link connected to an end of the assisting force exerting device, wherein the assisting force exerting device and the support link are disposed between the lift link and the mower unit; a fixing member having a first position for permitting the assisting force from the assisting force exerting device to be transmitted to the mower unit by releasably engaging the support link with the lift link and the mower unit, and a second position for prohibiting the assisting force from the assisting force exerting device from being transmitted to the mower unit by disengaging the support link from the lift link and the mower unit.

19 Claims, 10 Drawing Sheets

RIDING LAWN MOWER HAVING A FRONT MOWER UNIT

BACKGROUND OF THE INVENTION

This invention relates to a lawn mower, and more particularly to a lawn mower having a mower unit vertically movably connected to the front of a vehicle body through lift links capable of vertical pivoting movement. The mower unit is supported switchable between a generally vertical position to which the mower unit is pivotable upward relative to the lift links to have its bottom plane facing forward away from the vehicle body, and a generally horizontal position to which the mower unit is pivotable downward relative to the lift links to have its bottom plane facing down.

A conventional example of such lawn mower is disclosed in Japanese Patent Application "Kokai" H3-224402 (page 9 and FIG. 5).

With this type of lawn mower, the mower unit is switchable to the generally vertical position to have its bottom plane facing forward away from the vehicle body. In this position, while remaining connected to the lift links, the mower unit may be cleaned or inspected.

With the conventional technique, because of the position of the center of gravity of the mower unit, a pivoting movement simply relying on the weight of the mower unit may result in only a small pivoting angle, thereby failing to set the bottom of the mower unit to a position fully facing forward. Even if an attempt is made to pivot the mower unit further upward, the mower unit may prove too heavy to raise. Thus, the bottom of the mower unit cannot be set to a position fully facing forward.

SUMMARY OF THE INVENTION

The object of this invention is to provide a lawn mower easy to pivot to a position having the bottom of a mower unit fully facing forward.

A riding lawn mower in accordance with the present invention comprises: a plurality of wheels; a vehicle body supported by said wheels; an engine supported by said vehicle body for driving at least one of said wheels; a lift link supported by said vehicle body; a mower unit adapted to be disposed forwardly of said vehicle body, having at least one cutting blade, and supported to be pivotable about an axis of a first pivot pin relative to said lift link between a generally horizontal position wherein said at least one cutting blade faces the ground, and a generally vertical position wherein said at least one cutting blade is oriented forward; an assisting force exerting means for exerting an assisting force for moving the mower unit to the generally vertical position; a support link connected to an end of said assisting force exerting device, wherein said assisting force exerting means and the support link are disposed between said lift link and said mower unit; a fixing member having a first position for permitting the assisting force from said assisting force exerting means to be transmitted to said mower unit by releasably engaging said support link with one of said support links and said mower unit, and a second position for prohibiting the assisting force from said assisting force exerting means from being transmitted to said mower unit by disengaging said support link from said one of said support links and said mower unit.

The mower unit can be moved to the generally vertical position easily since, in the first position, the assisting force exerting means can apply the assisting force to the mower unit.

DETAILED DESCRIPTION OF PREFERRED EMBODIMENTS

An embodiment of this invention will be described hereinafter with reference to the drawings.

Figure 1:
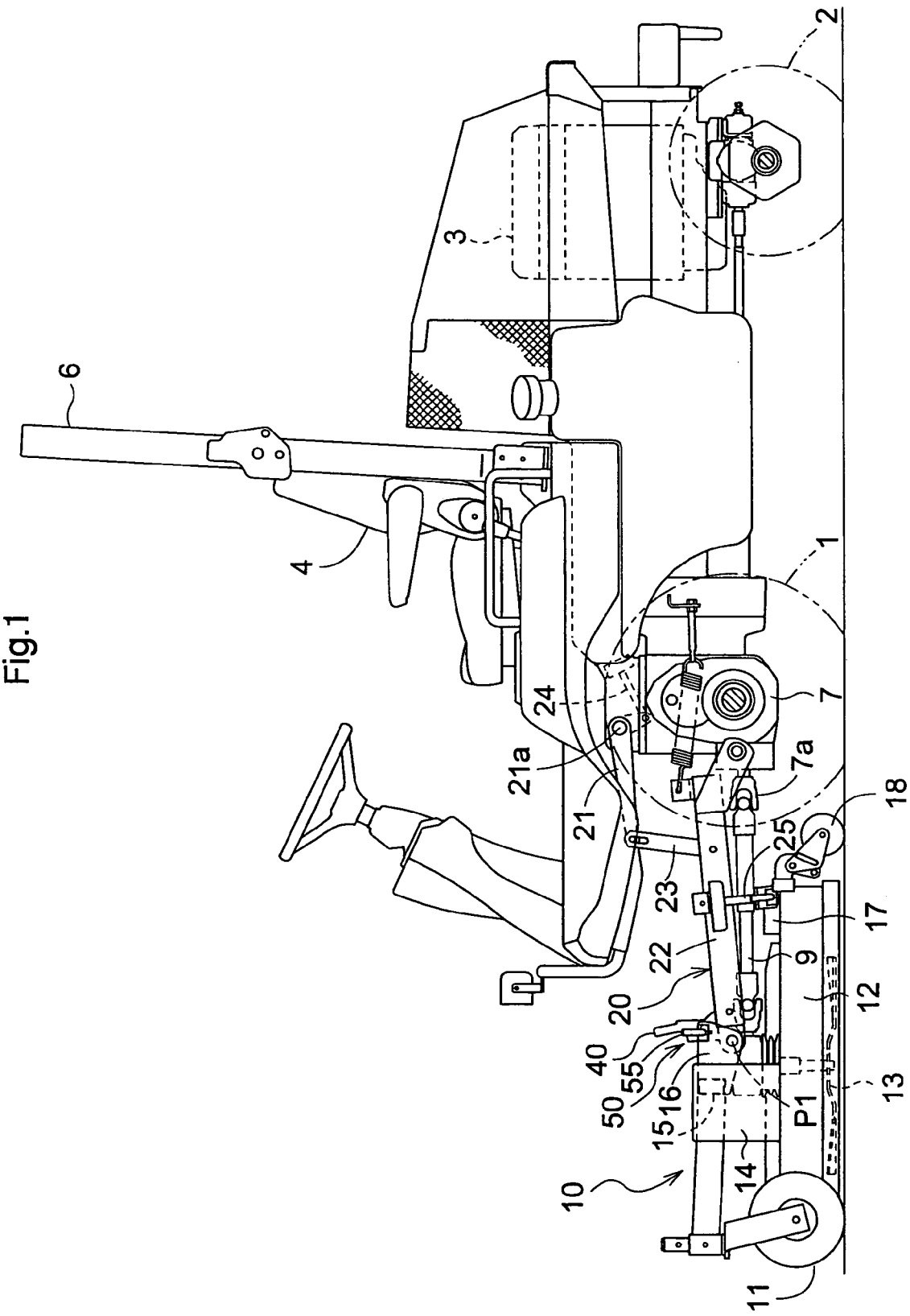
FIG. 1 is a side elevation of a riding lawn mower.
Figure 2:
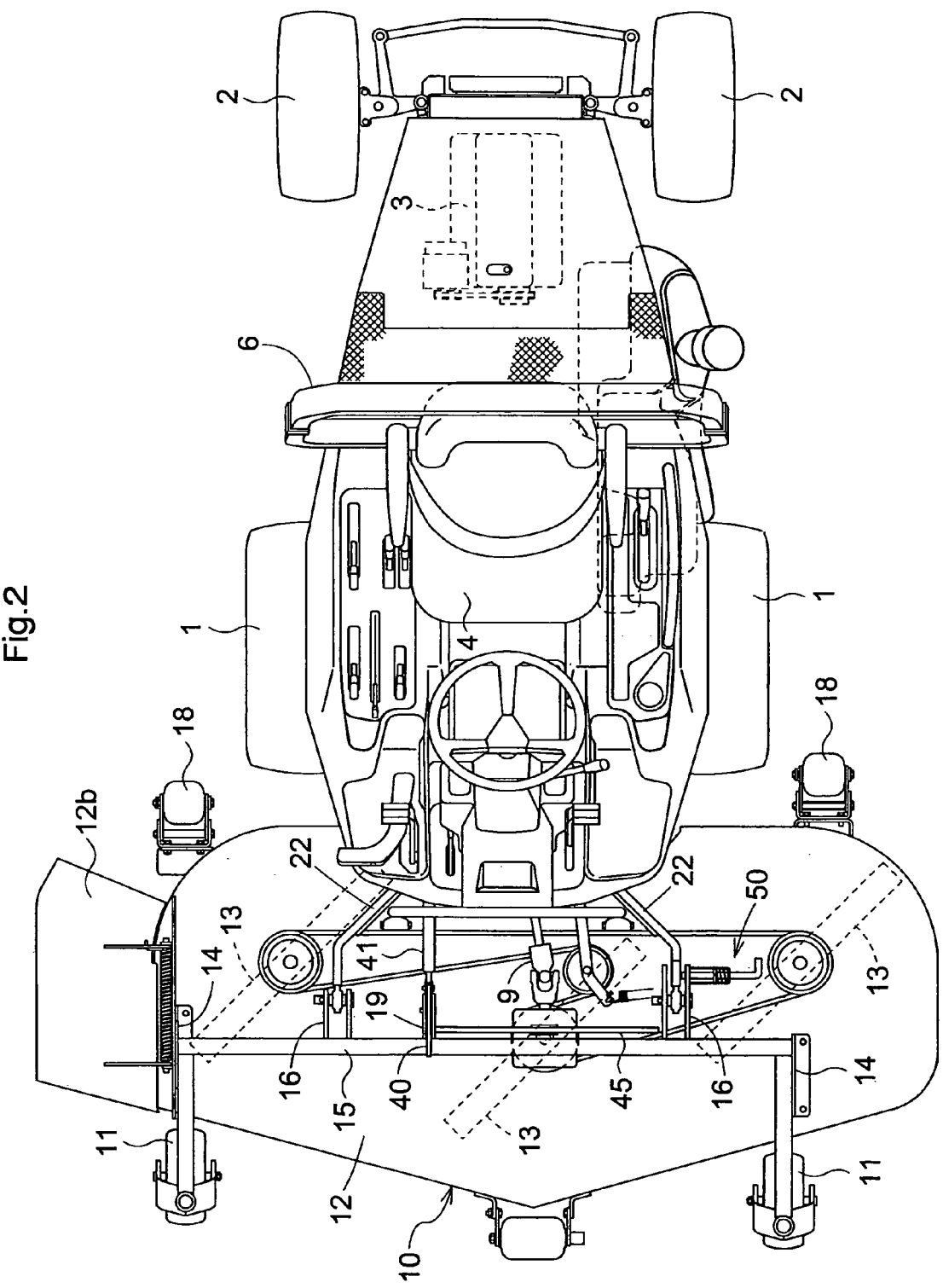
FIG. 2 is a plan view of the lawn mower.

As shown in FIGS. 1 and 2, a riding lawn mower includes a vehicle body having a pair of right and left front wheels 1 that can be driven, a pair of right and left rear wheels 2 that can be driven and are dirigible, a motor section including an engine 3 mounted on a rear portion of the vehicle body, a driving platform including a driver's seat 4 mounted on the vehicle body close to and forwardly of the motor section, and a safety frame 6 mounted adjacent the rear of the driver's seat 4.

A mower unit 10 is connected to the vehicle body through a link mechanism 20 extending forward from a front transmission case 7 forming part of a vehicle body frame. Drive of the engine 3 is transmitted to the mower unit 10 through a rotary shaft 9 from a power takeoff shaft 7a disposed in the front transmission case 7.

This lawn mower performs a grass cutting operation. When a pair of right and left lift arms 21 of the link mechanism 20 are swung up and down, the link mechanism 20 is swung up and down relative to the front transmission case 7. As a result, the mower unit 10 moves between a lower operative position having ground-engaging gauge wheels 11 in contact with the ground, and an upper inoperative position having the ground-engaging gauge wheels 11 raised from the ground. When the vehicle body runs with the mower unit 10 placed in the lower operative position, the mower unit 10 cuts grass with a plurality of rotary cutting blades 13 arranged sideways in a blade housing 12 and driven to rotate about vertical axes. Grass clippings are carried by air currents generated by rotation of the cutting blades 13, through the interior of the blade housing 12 to a discharge opening 12b located at one lateral end of the blade housing 12, to be discharged from the blade housing 12 through the discharge opening 12b.

Figure 3:
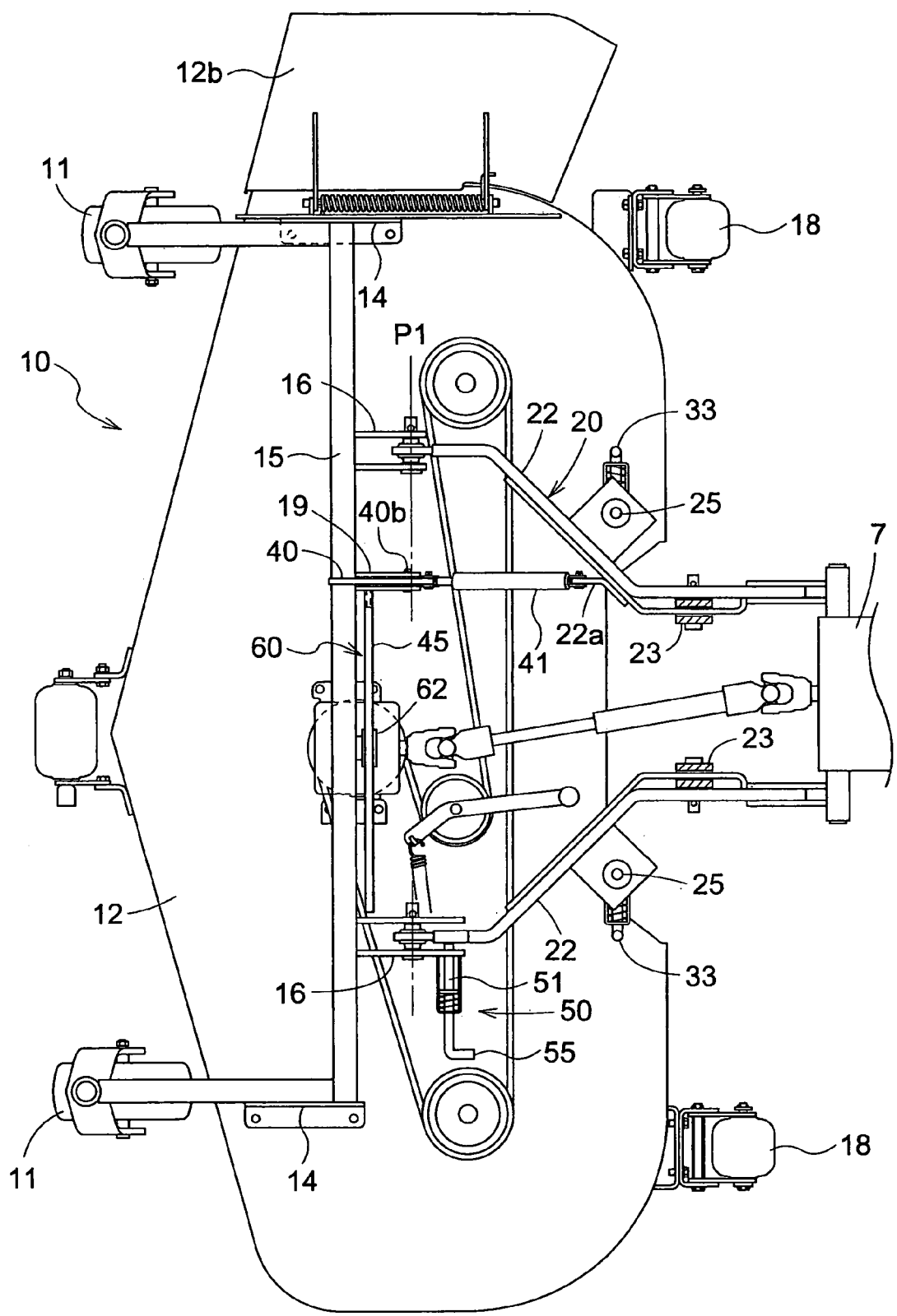
FIG. 3 is a plan view of a mower unit.

As shown in FIGS. 1 and 3, the link mechanism 20 includes lift links 22 extending forward from opposite lower sides of the front transmission case 7 to be pivotable up and down, lift arms 21 supported by opposite upper sides of the front transmission case 7 to be pivotable up and down, a lift rod 23 interconnecting a forward end of the left lift arm 21 and an intermediate position of the left lift link 22, and a lift rod 23 interconnecting a forward end of the right lift arm 21 and an intermediate position of the right lift link 22.

Each lift arm 21 is interlocked with a lift cylinder 24 disposed in an upper position of the front transmission case 7 through a rotary support shaft 21a pivotably connecting proximal ends of the right and left lift arms 21 to front transmission case 7. The forward end of each lift link 22 is connected to a connecting bracket 16 disposed on an upper surface of the blade housing 12 of the mower unit 10 to be pivotable about an axis P1 extending transversely of the vehicle body. Each connecting bracket 16 is fixed to a connecting frame 15 fixed to the upper surface of the blade housing 12 through a pair of right and left connecting plates 14. A position regulating rod 25 is connected between an intermediate position of each lift link 22 and a bracket 17 fixed to the upper surface of a rear portion of the blade housing 12 of the mower unit 10.

Figure 5:
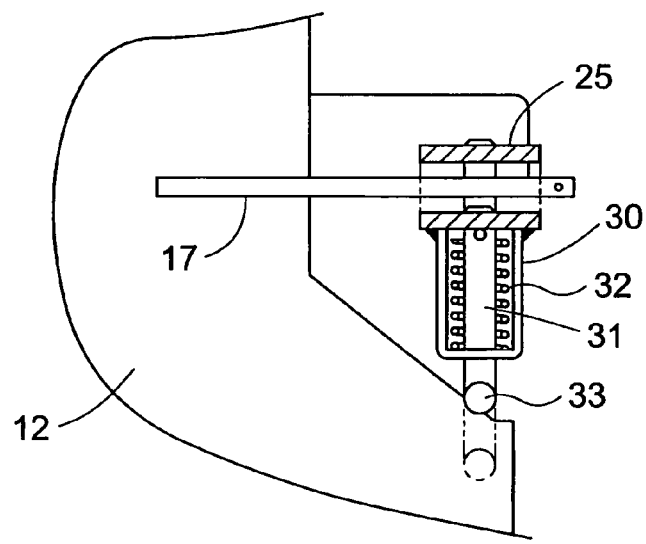
FIG. 5 is a sectional view of a structure for detachably attaching a position regulating rod.

As shown in FIG. 5, each of the position regulating rod 25 connected to the left-hand lift link 22 and the position regulating rod 25 connected to the right-hand lift link 22 has, at a lower end thereof, a connecting pin 31 slidably supported by a pin holder 30 fixed to the position regulating rod 25, a connecting spring 32 for biasing the connecting pin 31 to slide into the bracket 17 of the blade housing 12, and a manual control 33 attached to an end of the connecting pin 31 for sliding the connecting pin 31 out of the bracket 17 against the force of the connecting spring 32.

That is, each position regulating rod 25 is connectable to and disconnectable from the rear position of the blade housing 12 by inserting and withdrawing the connecting pin 31 into/from the bracket 17 of the blade housing 12. When the connection by the position regulating rods 25 of the rear positions of the blade housing 12 to the lift links 22 is canceled, the mower unit 10 becomes pivotable upward and downward about the axis P1 relative to the lift links 22.

Figure 4:
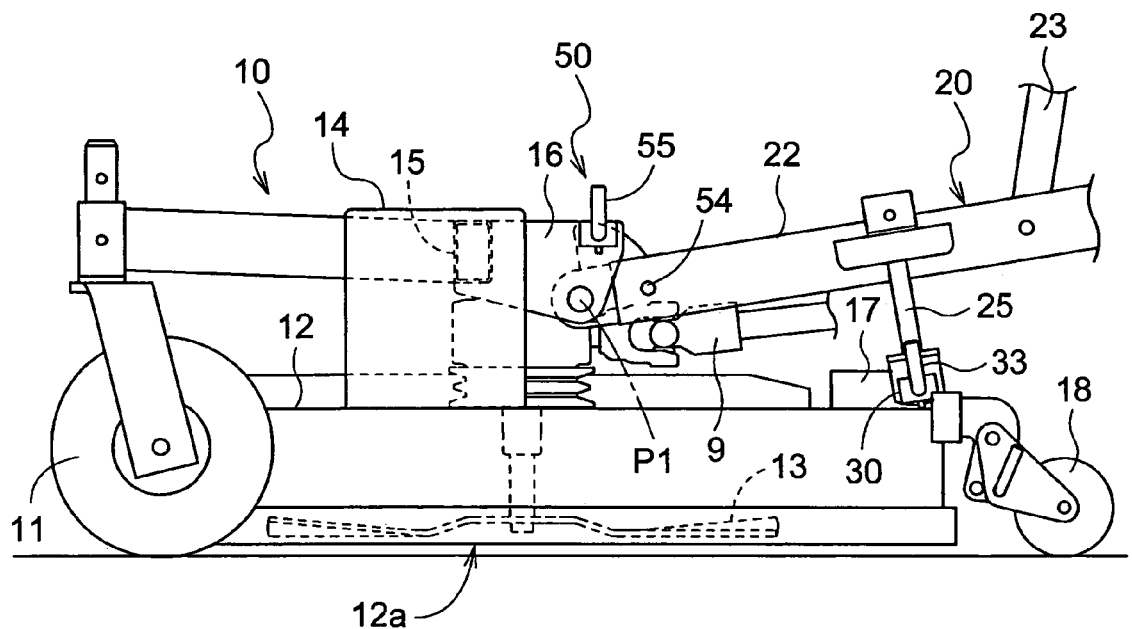
FIG. 4 is a side view of the mower unit.
Figure 6:
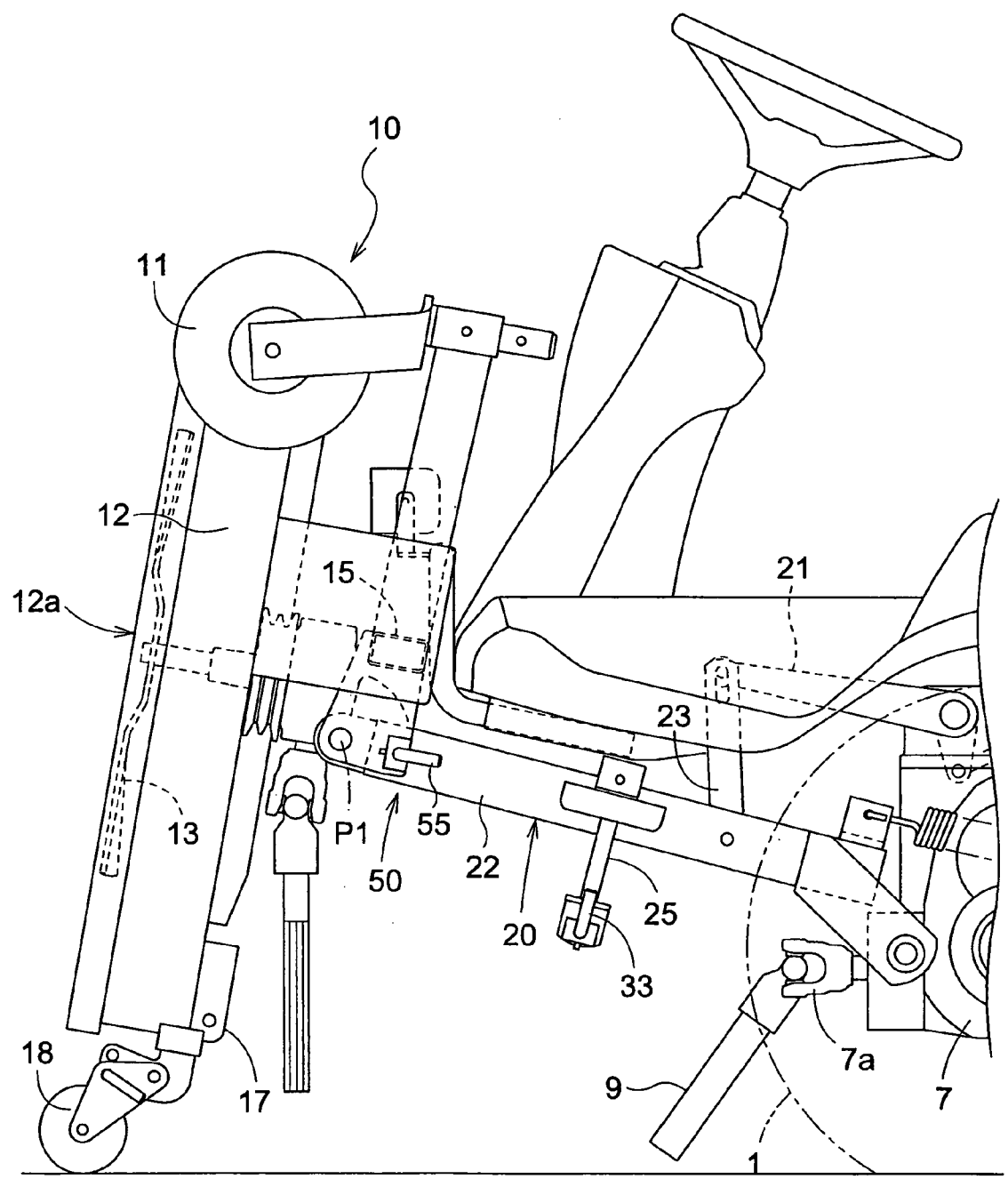
FIG. 6 is a side view of the mower unit in a vertical position.

When the lift links 22 are raised and each position regulating rod 25 is detached from the bracket 17 of the blade housing 12, the mower unit 10 becomes pivotable upward and downward about the axis P1 relative to the lift links 22. By pivoting the mower unit 10 upward relative to the lift links 22, as shown in FIG. 6, the mower unit 10 is stood on the ground with obstacle ride-over rollers 18 at the rear of the blade housing 12 contacting the ground. The mower unit 10 now assumes a vertical position in which the bottom of the mower unit 10 defining an opening 12a of the blade housing 12 faces forward away from the vehicle body. The "vertical" as used herein does not strictly mean the vertical direction, but means an angular range including the 90 degrees from 45 degrees to 135 degrees to a horizontal ground, for example. By pivoting the mower unit 10 downward relative to the lift links 22, as shown in FIG. 4, the mower unit 10 is placed in a horizontal position in which the mower unit 10 depends from the lift links 22, and the bottom of the mower unit 10 with the opening 12a of the blade housing 12 faces down.

Figure 7:
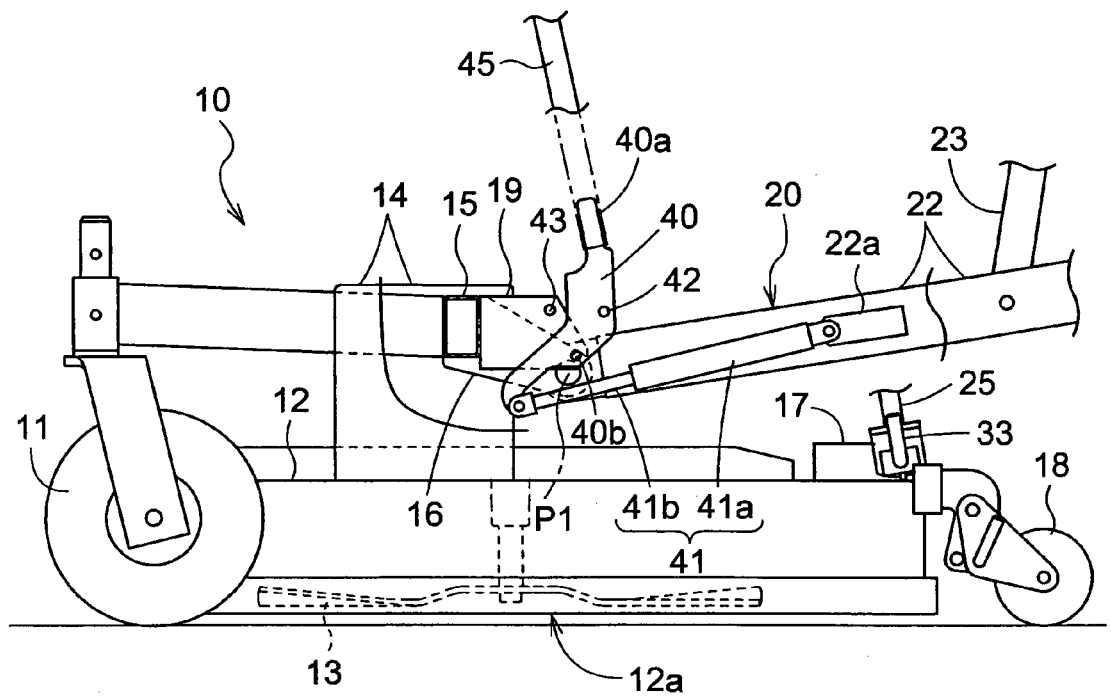
FIG. 7(A) is a side view of an assisting force exerting means in an inoperative state.
FIG. 7(B) is a side view of the assisting force exerting device in an operative state.
Figure 7:
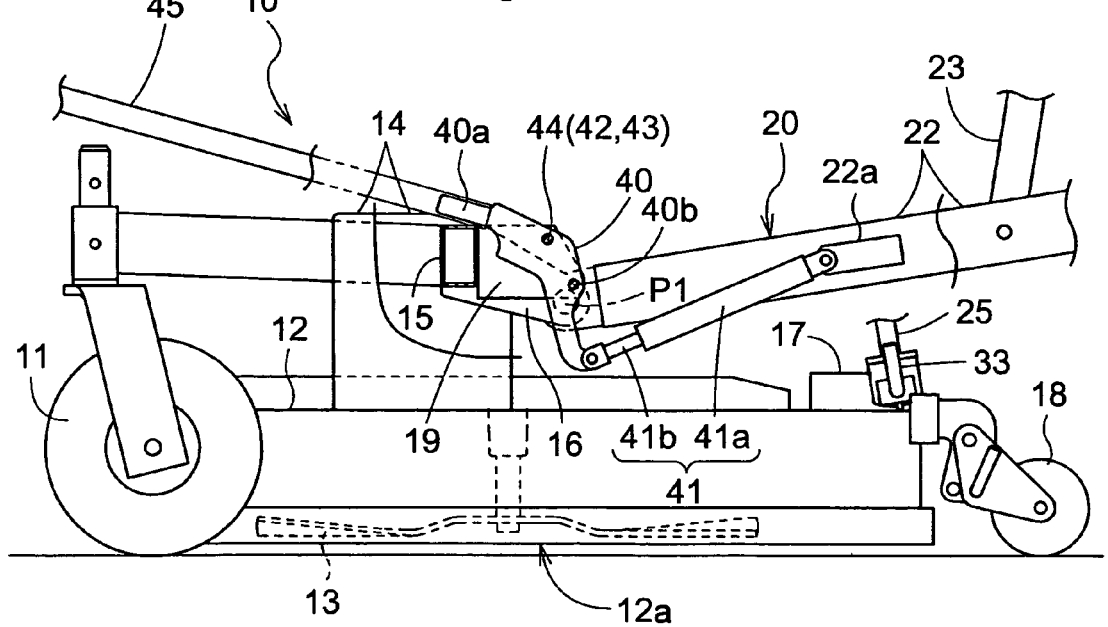
Figure 10:
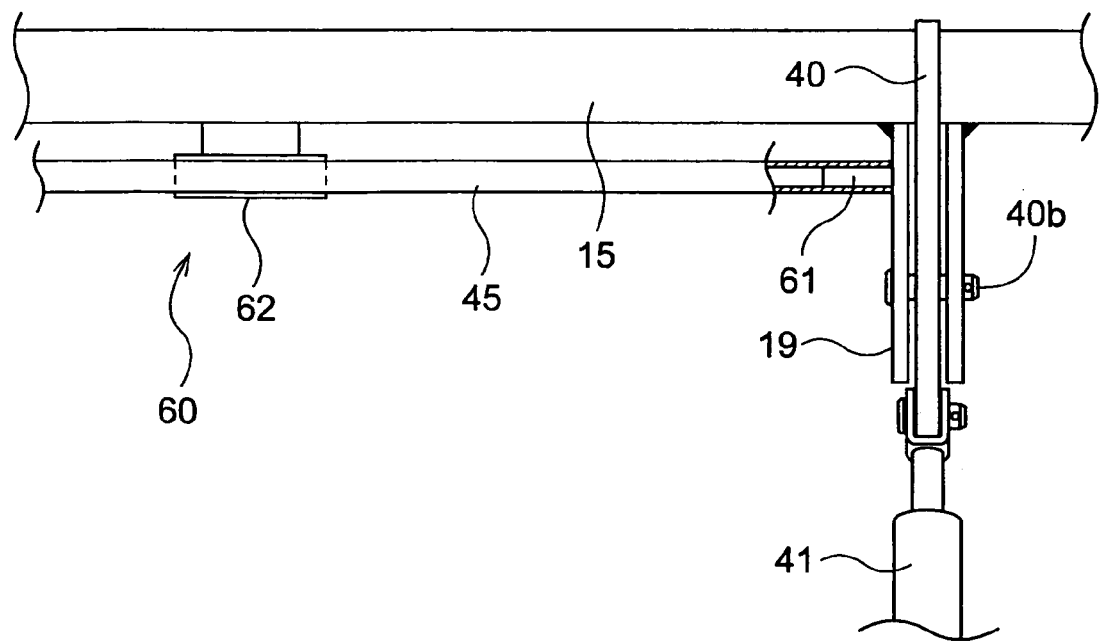
FIG. 10 is a plan view of a storage device.

As shown in FIGS. 3, 7, and 10, the mower unit 10 includes a support link 40 supported in an intermediate position thereof through a connecting pin 40b by a bracket 19 attached to the connecting frame 15. A gas spring 41 is connected to the lower end of the support link 40 and a bracket 22a fixed to one of the lift links 22. The connecting plates 14, connecting frame 15 and bracket 19 constitute a mounting frame.

The gas spring 41 has a cylinder tube 41a pivotably supported at one end thereof by the bracket 22a of the lift link 22, a cylinder rod 41b pivotably supported at one end thereof by the support link 40, and a gas (not shown) contained inside the cylinder tube 41a.

The cylinder rod 41b is inserted into the cylinder tube 41a to be extendible and retractable by sliding relative thereto. The gas is contained in the cylinder tube 41a to be operative to bias the cylinder rod 41b in a direction to project from the cylinder tube 41a as the cylinder rod 41b retracts into the cylinder tube 41a.

Thus, when the cylinder rod 41b retracts into the cylinder tube 41a, the gas spring 41 is resiliently deformed to store an elastic restoring force that biases the cylinder rod 41b in a direction to slide and project from the cylinder tube 41a.

The support link 40 is supported by the bracket 19 to be pivotable about an axis identical to or substantially the same as the axis of the connecting pin 40b or the axis P1 about which the forward ends of the right and left lift links 22 are pivotable relative to the brackets 16. As shown in FIG. 7, the support link 40 and bracket 19 have pin holes 42 and 43 formed therein. When a lock pin 44 is attached to the two pin holes 42 and 43 as shown in FIG. 7(B), the support link 40 switches to a state of being fixed, against pivoting movement, to the connecting frame 15 of the mower unit 10. When the lock pin 44 is removed from the two pin holes 42 and 43 as shown in FIG. 7(A), the support link 40 switches to a free state of being pivotable about the axis P1 relative to the connecting frame 15 of the mower unit 10.

When, with the mower unit 10 in the horizontal position relative to the lift links 22, the support link 40 is switched to the non-pivotable state, the support link 40 contracts the gas spring 41 to the state where the elastic restoring force of the gas spring 41 is transmitted to the bracket 19 through the support link 40 and lock pin 44. Thus, the gas spring 41 switches to an elastic force exerting state for applying the elastic restoring force stored therein, as an operating force that switches the mower unit 10 to the vertical position, to the connecting frame 15 of the mower unit 10 through the support link 40 and lock pin 44.

When the support link 40 is switched to the freely pivotable state, even if the mower unit 10 is in the horizontal position relative to the lift links 22, the support link 40 is pivoted by the elastic restoring force of the gas spring 41. Thus, the gas spring 41 switches to an inoperative state for canceling the operating force applied to the mower unit 10.

As shown in FIG. 7, the support link 40 is controllable with a bar handle 45 detachably attached to a handle connecting portion 40a formed at the upper end of this support link 40. The bar handle 45 is formed of angle pipe. One end of the bar handle 45 is fitted on the handle connecting portion 40a of the support link 40, to rock the support link 40 about the pivotal axle. Then, the support link 40 rocks with the bar handle 45 to become the non-pivotable state, and to contract the gas spring 41.

As shown in FIG. 3, the blade housing 12 of the mower unit 10 has a lock mechanism 50 with a lock pin 51 provided above one lateral end thereof.

Figure 9:
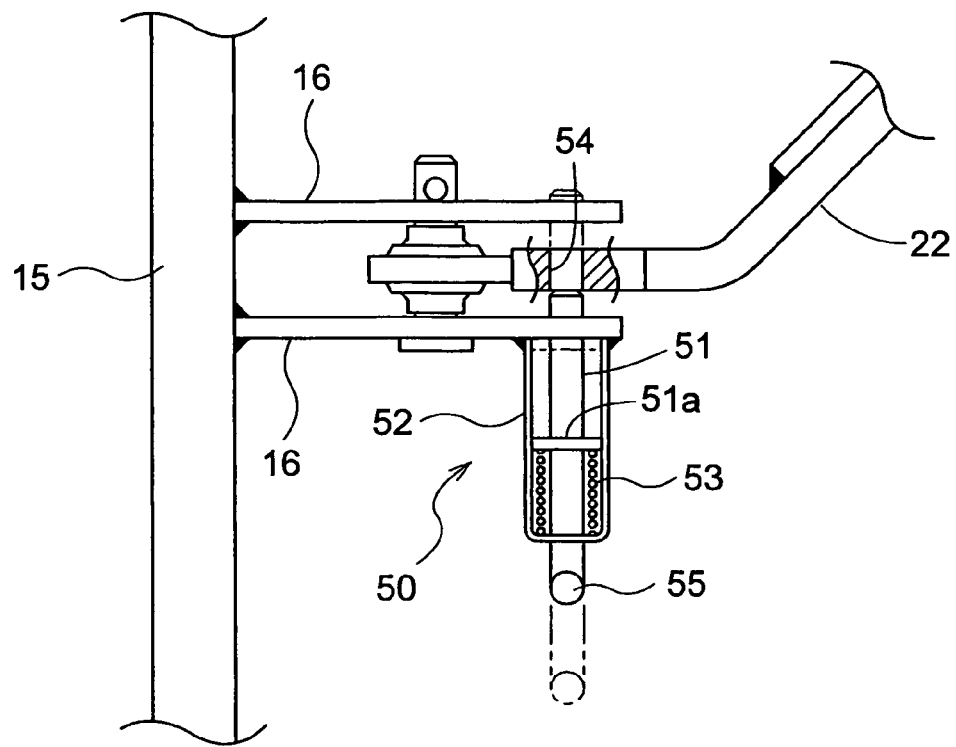
FIG. 9 is the sectional view of a lock mechanism.

As clearly shown in FIG. 9, the lock mechanism 50 includes the lock pin 51 slidably supported by a pin holder 52 fixed to a lateral surface of the bracket 16 attached to the connecting frame 15, a lock spring 53 mounted on the lock pin 51, and a pin hole 54 formed in the forward end of the lift link 22 connected to the bracket 16.

The lock pin 51 and pin hole 54 are arranged such that, when the mower unit 10 pivots upward relative to the lift links 22 to assume the vertical position, the lock pin 51 becomes aligned to the pin hole 54 to be movable into the latter. The lock spring 53 presses on a spring bearing 51a formed on the lock pin 51, thereby biasing the lock pin 51 to slide into the pin hole 54.

Thus, when the mower unit 10 pivots upward relative to the lift links 22 to assume the vertical position, the lock spring 53 inserts the lock pin 51 into the pin bore 54. The lock pin 51 fixes the bracket 16 to the lift link 22 not to be pivotable. In this way, the lock mechanism 50 is automatically switched to a locking state by the lock spring 51 for fixing the mower unit 10 to the vertical position. The lock pin 51 has a control 55 formed at an end thereof projecting from the pin holder 52, for sliding the lock pin 51 against the lock spring 53 out of the pin hole 54. The lock mechanism 50 may then be switched to a lock release state for releasing the mower unit 10 from the vertical position.

That is, when performing a mowing or grass cutting operation, the lift cylinders 24 are operated, with the mower unit 10 having the rear end of the blade housing 12 connected to the right and left lift links 22 by the pair of position regulating rods 25. Then, the lift cylinders 24 vertically rock the pair of right and left lift arms 21 together. The left lift arm 21 vertically rocks the left lift link 22 through the lift rod 23. The right lift arm 21 vertically rocks the right lift link 22 through the lift rod 23. The forward end of each lift link 22 applies a vertical force to the connecting frame 15 of the mower unit 10. As a result, the mower unit 10 descends to the lower operative position, or ascends to the upper inoperative position. At this time, the intermediate position of each lift link 22 supports the rear of the blade housing 12 through the position regulating rod 25. The mower unit 10 is thereby movable up and down between the lower operative position and upper inoperative position, with the bottom having the opening 12a of the blade housing 12 facing down.

At this time, the support link 41 is switched to the freely pivotable state. Then, the gas spring 41 switches to the inoperative state, and the mower unit 10 rocks up and down about the axis P1 when the gauge wheels 11 and the rollers 18 enter dents in the ground or ride on ridges.

Figure 8:
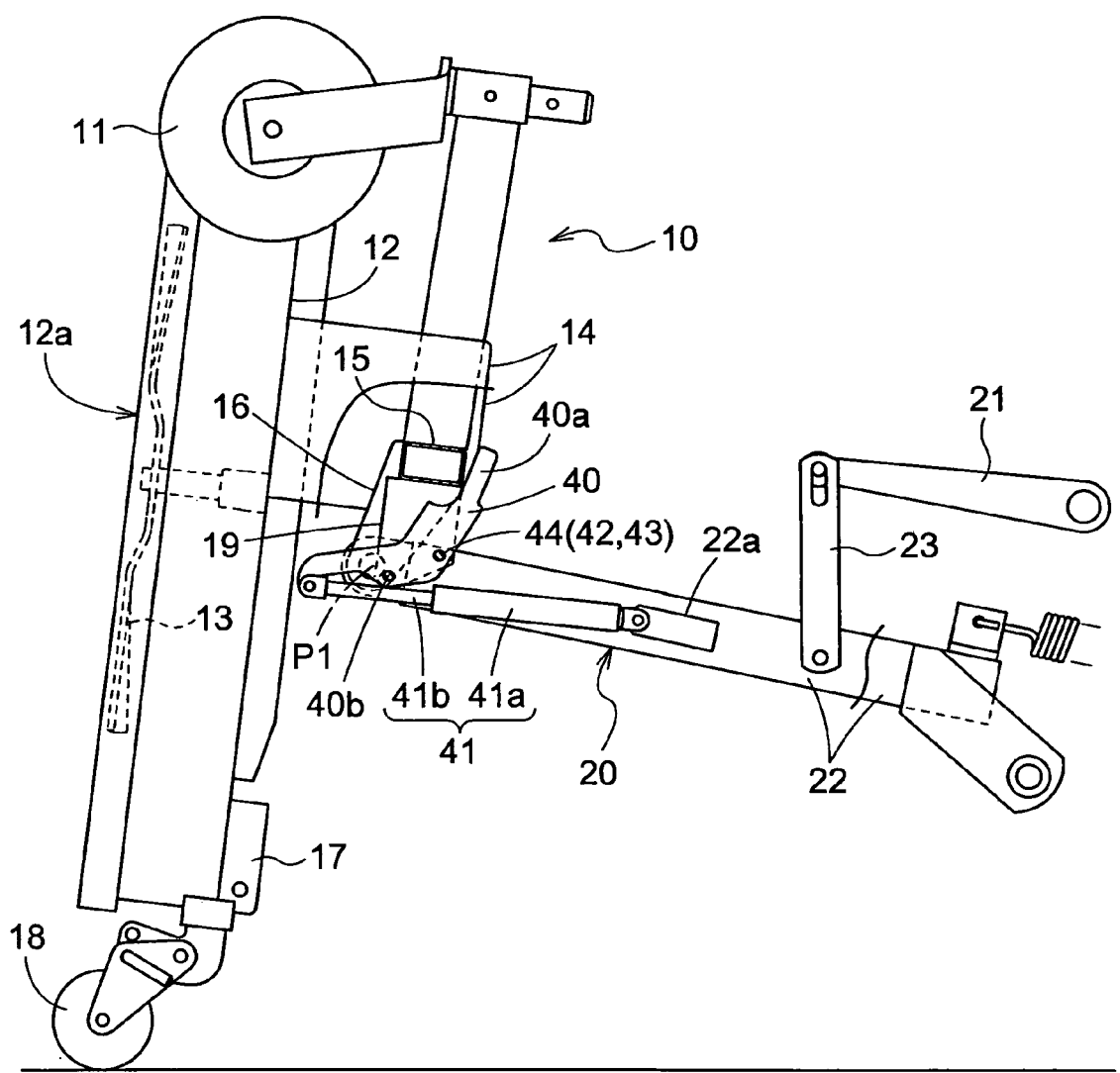
FIG. 8 is a side view showing an upward movement of the mower unit.

When cleaning or inspecting the interior of the blade housing 12 of the mower unit 10, as shown in FIG. 7(A), the lift links 22 are lowered, and the mower unit 10 is supported by the lift links 22 in the horizontal position with the bottom thereof facing down, and the gauge wheels 11 contacting the ground. Next, as shown in FIG. 7(B), the bar handle 45 connected to the support link 41 is rocked to contract the gas spring 41, storing an elastic restoring force in the gas spring 41. At the same time, the lock pin 44 is attached to the support link 40 to switches the support link 40 to the locking state not to be pivotable, thereby switching the gas spring 41 to the elastic force exerting state. Subsequently, as shown in FIG. 8, the lift links 22 are raised to raise the connecting frame 15 of the mower unit 10. At this time, the pair of position regulating rods 25 are removed from the brackets 17 of the blade housing 12 to disconnect the rear of the blade housing 12 from the lift links 22. When the connecting frame 15 of the mower unit 10 is raised, the mower unit 10 pivots upward about the axis P1 relative to the lift links 22. As a result, the blade housing 12 assumes the vertical position standing on the rollers 18 contacting the ground. At this time, the gas spring 41 exerts the elastic restoring force, which is applied to the mower unit 10 through the support link 40 as an operating force acting in the direction to switch the mower unit 10 to the vertical position. With this assisting action of the gas spring 41, the mower unit 10 may be rocked to the vertical position with ease. When the mower unit 10 is in the vertical position, the opening 12a of the blade housing 12 of the mower unit 10 faces forward away from the vehicle body, to facilitate an operation to clean or inspect the interior of the blade housing 12 from a position forward of the vehicle body. When the mower unit 10 becomes the vertical position, the lock pin 51 of the lock mechanism 50 is inserted into the pin hole 54 of the lift link 22 by the lock spring 53, whereby the lock mechanism 50 automatically switches to the locking state. Thus, the cleaning or inspecting operation may be carried out while the mower unit 10 is fixed to the vertical position by the lock mechanism 50, so that the mower unit 10 remains in the vertical position against vibration or its own weight.

As shown in FIG. 3, a storage device 60 is provided adjacent the connecting frame 15 and above the upper surface of the blade housing 12 of the mower unit 10 for storing the bar handle 45 detached from the support link 40.

As clearly shown in FIG. 10, the storage device 60 includes an engaging piece 61 fixed to the bracket 19 of the connecting frame 15, and a catcher 62 supported by the connecting frame 15.

The engaging piece 61 fits on and engages one end of the bar handle 45, while the catcher 62 fits on and grips an intermediate part of the bar handle 45. In this way, the storage device 60 stores the bar handle 45 in a contained position extending along the connecting frame 15 between the brackets 19 and 16.

Other Embodiments

The object of this invention can be fulfilled by replacing the gas spring 41 with any other known device such as a coil spring. The gas spring 41, coil spring and the like are collectively called herein the assisting force exerting device 41.

Figure 11A:
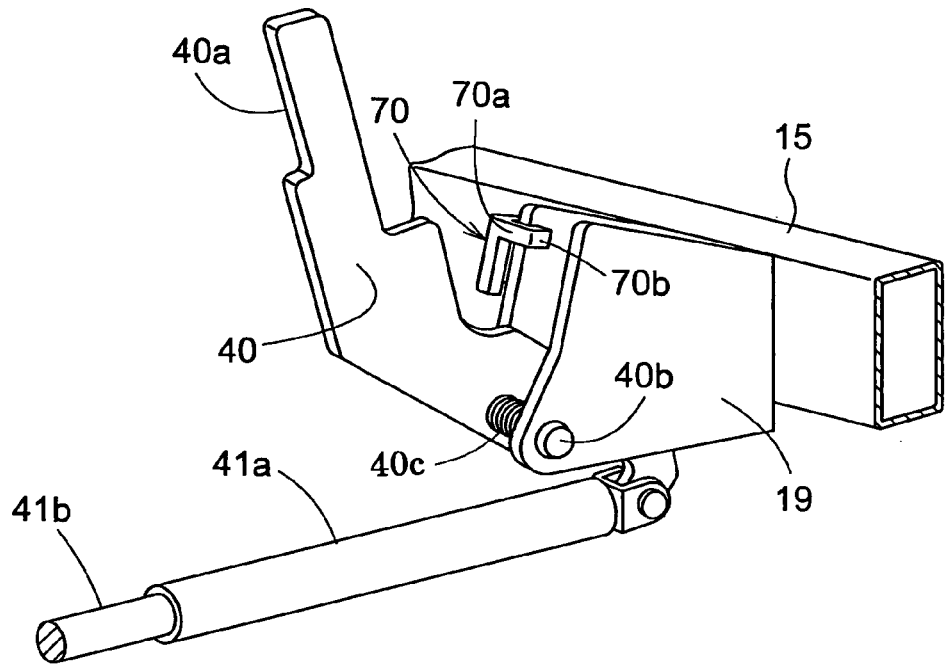
FIG. 11(A) is a view of a mechanism for fixing a support link to a mower unit in another embodiment, showing the support link not fixed to the mower unit.
Figure 11B:
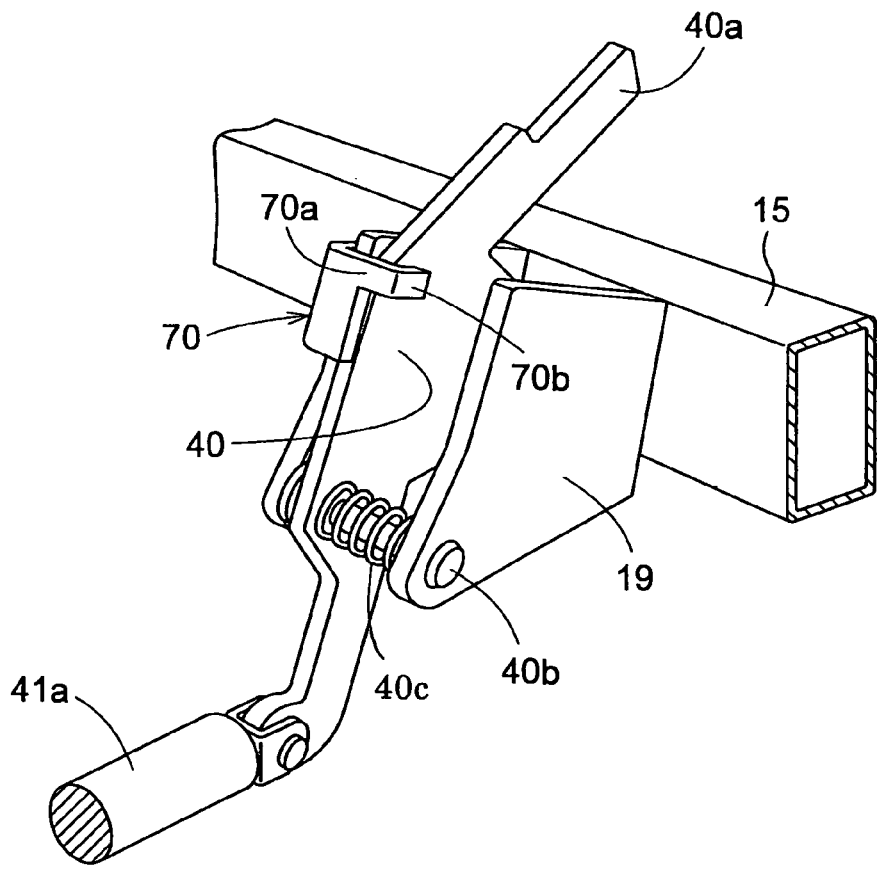
FIG. 11(B) is view showing the support link fixed to the mower unit in the embodiment shown in FIG. 11 (A)

FIGS. 11(A) and (B) show another embodiment of the mechanism for releasably fixing the support link 40 to the mower unit 10. The support link 40 is rotatably attached through the connecting pin 40b to the bracket 19. In addition, the support link 40 is slidable on the connecting pin 40b in transverse directions. The support link 40 is biased leftward of the connecting pin 40b by a spring 40c. The bracket 19 has a contact member 70 fixed to an upper position thereof. The contact member 70 has a first portion 70a extending generally transversely, and a second portion 70b extending generally forward.

Figure 12:
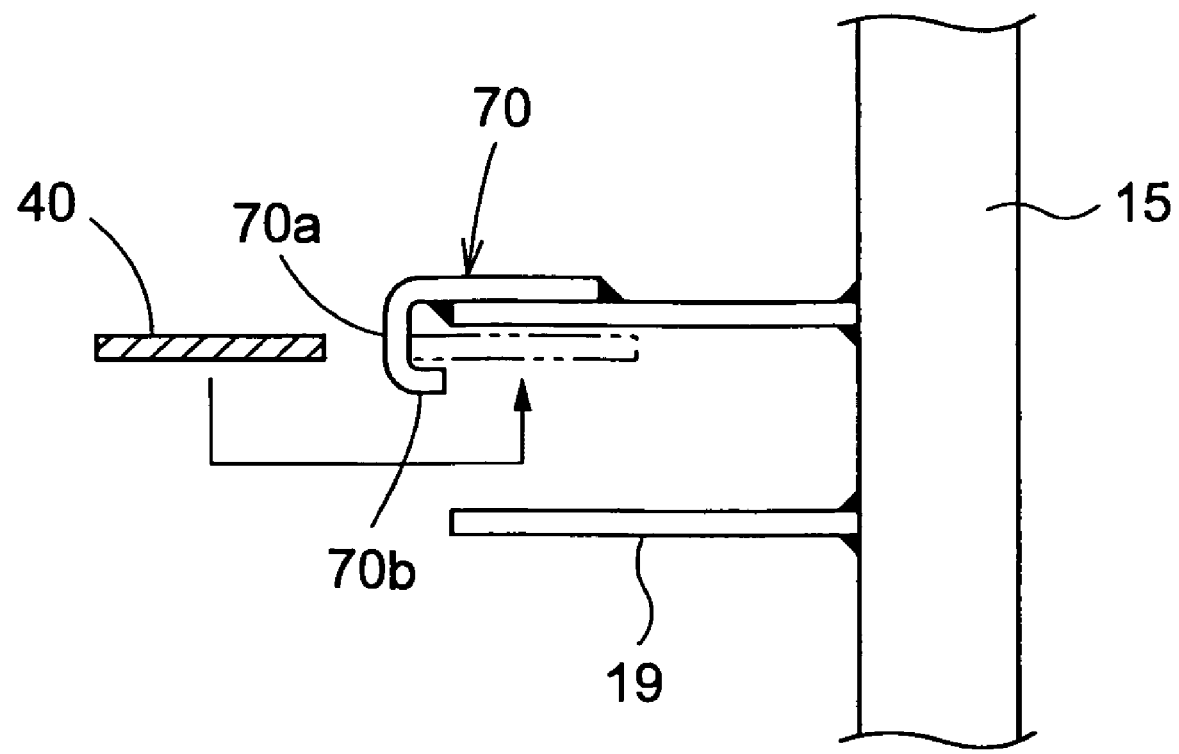
FIG. 12 is a plan view of the mechanism in the embodiment shown in FIGS. 11(A) and (B).

As shown in FIG. 12, in order to releasably fix the support link 40 to the mower unit 10, the support link 40 is moved rightward along the connecting pin 40b, then turned forward, and placed in contact with the first portion 70a of the contact member 70. The second portion 70b prevents the support link 40 from becoming disengaged from the contact member 70.

It is also possible to place the support link 40 between the rear end of the gas spring 41 and the lift link 22. In this case, the support link 40 can be pivotably attached to the bracket of the lift link 22. The forward end of the gas spring 40, preferably, is fixed to the arm portion extending downward from the bracket 19 of the mower unit 10. The lift link 22 and the support link may be restrained from pivoting relative to each other by a pin extending through bores formed therein.

The support link 40 may be attached to be rotatable about a transverse axis attached to the lift link 22, for example.

It is also possible to form a manual control such as a grip on the support link 40 itself. Then, the bar handle 45 is dispensed with.

What is claimed is:

1. A riding lawn mower having a front mower unit, comprising:
   a plurality of wheels;
   a vehicle body supported by said wheels;

an engine supported by said vehicle body for driving at least one of said wheels;

a lift link supported by said vehicle body;

a mower unit adapted to be disposed forwardly of said vehicle body, having at least one cutting blade, and supported to be pivotable about an axis of a first pivot pin relative to said lift link between a generally horizontal position wherein said at least one cutting blade faces the ground, and a generally vertical position wherein said at least one cutting blade is oriented forward;

an assisting force exerting means for exerting an assisting force for moving the mower unit to the generally vertical position;

a support link connected to an end of said assisting force exerting means, wherein said assisting force exerting means and the support link are disposed between said lift link and said mower unit;

a fixing member having a first position engaging the support link for permitting the assisting force from said assisting force exerting means to be transmitted to said mower unit by releasably engaging said support link with one of said lift link and said mower unit, and a second position disengaged from the support link for prohibiting the assisting force from said assisting force exerting means from being transmitted to said mower unit by disengaging said support link from said one of said lift link and said mower unit.

2. A riding lawn mower as defined in claim 1, wherein said mower unit includes a mower deck, and a mounting frame fixed to an upper surface of said mower deck, said support link being pivotably supported by said mounting frame.

3. A riding lawn mower as defined in claim 2, wherein said support link is pivotable about a second pivot pin disposed adjacent said first pivotal pin in side view.

4. A riding lawn mower as defined in claim 2, wherein said mounting frame and said support link have bores formed therein, respectively, said fixing member is a first lock pin that can be inserted through said bores to prevent a relative pivoting of said mounting frame and said support link, and wherein said first position of said fixing member is a position where said first lock pin extends through said bores, and said second position is a position where said first lock pin does not extend through at least one of said bores.

5. A riding lawn mower as defined in claim 2, wherein said lift link and said support link have bores formed therein, respectively, said fixing member is a first lock pin that can be inserted through said bores to prevent a relative pivoting of said lift link and said support link, and wherein said first position of said fixing member is a position where said first lock pin extends through said bores, and said second position is a position where said first lock pin does not extend through at least one of said bores.

6. A riding lawn mower as defined in claim 2, wherein said mounting frame includes connecting plates fixed to the upper surface of said mower deck and transversely spaced apart from each other, a connecting frame extending between and fixed to said connecting plates, and a bracket fixed to said connecting frame for pivotably supporting said support link.

7. A riding lawn mower as defined in claim 1, wherein said assisting force exerting means has a gas spring.

8. A riding lawn mower as defined in claim 1, wherein said assisting force exerting means has a spring.

9. A riding lawn mower as defined in claim 1, wherein said support link has a connecting portion for attaching a bar handle used to displacing said assisting force exerting means in order to store force.

10. A riding lawn mower as defined in claim 9, wherein said mower unit has a holder for holding said bar handle.

11. A riding lawn mower as defined in claim 1, further comprising a second fixing member disposed between said mower unit and said lift link for steadily fixing said mower unit in said generally vertical position.

12. A riding lawn mower as defined in claim 11, wherein said second fixing member includes a second lock pin provided to one of said mower unit and said lift link for fixing said mower unit in said generally vertical position, and a pin hole formed in the other of said mower unit and said lift link to be alignable with said second lock pin when said mower unit moves to said generally vertical position, said second lock pin being biased in a direction to engage said pin hole.

13. A riding lawn mower as defined in claim 1, wherein said fixing member includes a contact member supported by one of said mower unit and said lift link for contacting said support link, said first position being a position where said support link contacts said contact member, thereby permitting said assisting force to be transmitted from said support link to said contact member, and said second position is a position where said support link is substantially out of contact with said contact member, thereby prohibiting said assisting force from being transmitted from said support link to said contact member.

14. A riding lawn mower as defined in claim 13, wherein said contact member has a first portion extending generally transversely, and a second portion continuous with said first portion and extending generally forward.

15. A riding lawn mower as defined in claim 1, wherein
the support link is connected to the end of the assisting force exerting means such that the assisting force is applied directly to the support link.

16. A riding lawn mower as defined in claim 1, wherein the fixing member is adapted to be removed manually by an operator.

17. A riding lawn mower as defined in claim 1, wherein
the support link has a first support link position wherein the fixing member is allowed to be in the first position and a second support link position away from the first support link position and wherein
the assisting force exerting means is configured to urge the support link toward the second support link position at all times.

18. A riding lawn mower as defined in claim 17, wherein
the support link has a first portion for allowing the support link to be manually moved to the first support link position against the urging force of the assisting force exerting means, and
the first portion of the support link is located forwardly of the front wheels of the vehicle so as to allow an operator to have substantially free access to the first portion from above.

19. A riding lawn mower as defined in claim 1, wherein the first portion is a handle connecting portion.

* * * * *